Jan. 14, 1964 F. E. BARON ETAL 3,118,095

CAPACITOR AND TERMINAL THEREFOR

Filed Sept. 29, 1960

INVENTORS
Frank E. Baron
BY William R. Belko, Jr.

Johnson and Kline
ATTORNEYS

United States Patent Office 3,118,095
Patented Jan. 14, 1964

3,118,095

CAPACITOR AND TERMINAL THEREFOR

Frank E. Baron, Monroe, and William R. Belko, Jr., Huntington, Conn., assignors to Vitramon, Incorporated, Monroe, Conn., a corporation of Delaware Filed Sept. 29, 1960, Ser. No. 59,251
9 Claims. (Cl. 317—261)

This invention relates to capacitors. More specifically, it pertains to a stacked capacitor, in which there are a plurality of electrically conductive plates separated and predeterminately spaced by a dielectric material, and to a method of making the same.

Prior to the present invention, stacked capacitors have been known which include a plurality of plates of electrically conductive material separated by wafers or the like of dielectric material. In the assembly of these capacitors, the alternate electrically conductive plates thereof were electrically connected by metal foil or similar conducting mediums which were folded in and out of the body formed by the stack.

While capacitors of the above type and variations thereon generally serve the purposes for which they were designed, they present a number of serious problems that must be overcome. The capacitors of the prior art were bulky as a result of the protruding elements which were necessary to electrically connect the alternate plates and thus there was poor economy of space; small, compact encapsulated or plain assemblies could not readily be provided to meet the requirements of modern electronic circuitry. Further, it is difficult and time consuming to assemble capacitors in which the lead means between the plates must be manipulated, as is the case with foil or the like, in and out of the capacitor body to properly connect alternate plates and, after the capacitor is assembled, means must be resorted to for securing the assembled unit together to form a body. Also, in structures having elements protruding from the body, there is the everpresent danger of damage in handling and of reduced reliability. Finally, the capacitors of the prior art are not readily adapted to meet the new, higher capacitance requirements of modern electronic circuits without substantial increases in size.

The present invention overcomes the problems presented by prior art capacitors and provides an improved capacitor structure.

According to the invention, the capacitor is formed from a plurality of units, each of which include a wafer of dielectric material having conducting areas of different predetermined patterns formed on the opposite surfaces thereof, the patterns being so designed as to space the edges of the conducting areas by the dielectric material and electrically communicate the areas to different edges of the unit. The units are stacked so that conducting areas of matching pattern are aligned and in electrical contact to form conductive plates between the wafers and then electrically conductive material is applied to different edges of the stack for both tying all of the units together to form a body and separately electrically connecting all of the plates of the same pattern to form two groups.

Thus, it is an object of the invention to provide a capacitor of the stacked type, having no protruding parts, which is readily adapted to being encapsulated or put to similar uses requiring compactness, economy of space and ruggedness, along with characteristics of high capacitance and reliability.

It is also an object of the invention to provide a capacitor structure in which the conducting plates lie wholly within the confines of the body formed by the stack and the means for electrically connecting alternate plates require a minimum of space and serve the dual function of tying the units forming the stack together.

It is another object of the invention to provide a capacitor in which the electrical characteristics and ratings may be readily varied by merely increasing or decreasing the number of units in the stack, and without altering the physical nature of the units themselves or substantially changing production procedures.

Another object of the invention is to provide a capacitor in which a large contact area is provided for lead wires or the like so the strength and electrical reliability of the unit is enhanced.

Still another object of the invention is to provide a stacked capacitor, in which the component units thereof cooperate in stacked position to provide conductive plates between the dielectric wafers of two different alternate patterns so that alternate plates of one pattern are spaced and insulated from the electrically conductive means used for electrically connecting the other plates.

Other objects and advantages of the invention will be apparent from the specification and claims when considered in connection with the attached sheet of drawings, illustrating one form of the invention, wherein like characters represent like parts, and in which:

Figures 1, 3, 4:
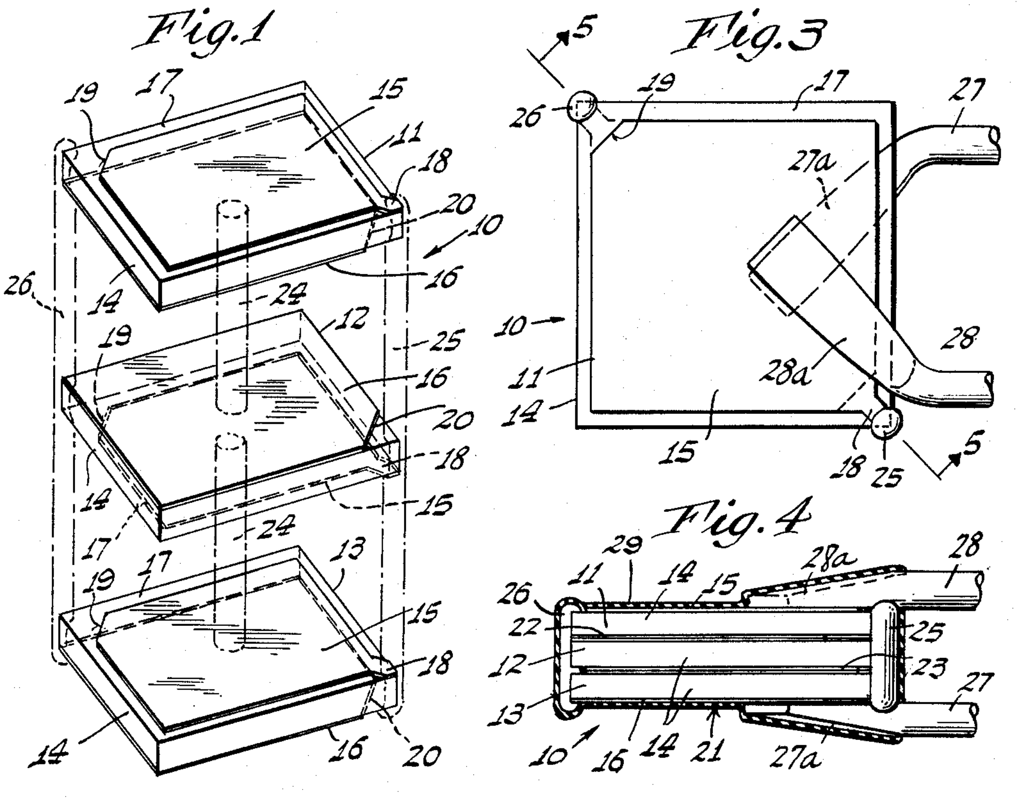
FIGURE 1 is an exploded perspective view of a capacitor embodying the invention.
FIG. 3 is a plan view of the capacitor of FIG. 2, without an impregnating coating.
FIG. 4 is a side elevational view of the capacitor of FIG. 2 showing in section the coating of resilient insulating material.
Figure 2:
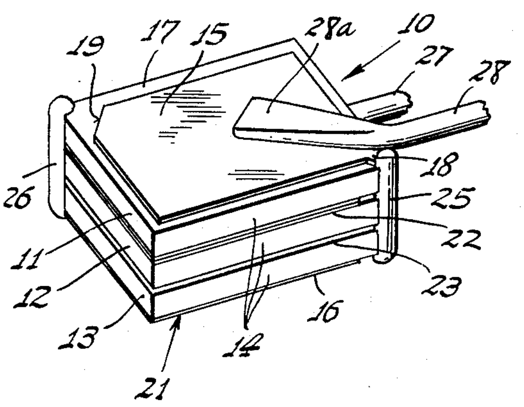
FIG. 2 is a perspective view of the capacitor of FIG. 1 without an impregnating coating.
Figure 5:
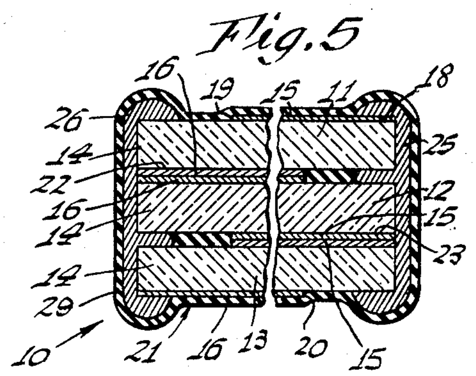
FIG. 5 is a cross-sectional view taken in the direction of the arrows 5—5 in FIG. 3 and also showing the coating of resilient insulating material.

The invention resides in a stacked capacitor structure in which the body of the capacitor is formed from a plurality of substantially identical separate units, structurally interconnected or tied together by the same means that electrically connect alternate plates of the capacitor to form two electrically separate groups, and specifically, it resides in the structure of the individual units which facilitate the assembly of the body.

Referring now to the drawings for a more detailed description of the invention, a capacitor embodying the invention is shown, generally indicated by the numeral 10. The capacitor includes a plurality of stacked units 11, 12 and 13, which may be varied in number, the number of units in part determining the capacitance of the assembly. Each unit, as is shown most clearly in FIG. 1, includes a wafer 14 of dielectric material having the opposite surfaces thereof provided with material forming electrically conductive areas 15 and 16. The wafers, which may be formed of any known insulating material, but preferably are a barium titanate ceramic or the like are normally in the range of 4 to 5 mils in thickness, and, while they may take any of a variety of shapes, including disk-like, in the preferred form of the invention are rectangular.

The electrically conductive areas 15 and 16, which are silver or the like, are formed on the opposite surfaces of each of the wafers in different patterns. As illustrated, the area 15 is formed in a pattern smaller than the surface of the wafer, so that a border 17 of the dielectric material surrounds the area, and includes a protruding tongue or the like 18 that cuts across the border at one corner of the wafer for electrically communicating the area with the edge of the unit. The diagonally opposite corner of the area has been removed as shown at 19. The other conductive area 16 of each unit is formed in a pattern substantially the same size as the surface of the wafer on which it is provided and has a corner, shown at 20, removed corresponding to and underlying the corner across which the area 15 electrically communicates with the edge of the unit. It will be seen that the pattern of conductive area 16 affords it electrical communication with all sides of the unit, except at that portion of the side in which conductive area 15 is in electrical communication.

While forming the conductive areas in different patterns serves an important purpose in the assembly of the capacitor, as will be hereinafter described, it will be seen from an examination of FIG. 1 that it also serves to space the edges of the conductive areas one from the other by the dielectric material of the wafer, thus substantially reducing the possibility of short circuit during the operation of the finished capacitor.

The units 11, 12 and 13 are assembled, to form a capacitor body 21, by stacking them with conductive areas of matching pattern aligned and in electrical and preferably also physical contact. For example, the unit 13 is positioned with the conductive area 15 facing upwardly and then the unit 12 is stacked thereon with its conductive area 15 facing downwardly to engage the conductive area 15 of unit 13. Similarly, unit 11 is stacked on unit 12 with its conductive area 16 facing downwardly for engagement with conductive area 16 of unit 12. It will be understood that as many units as are desired may be utilized in forming the stack so long as there are always an odd number of units, the odd number of units being necessary to assure that the electrodes or outer conductive areas of the end units are of different pattern.

The conductive areas 15 and 16 of the units 11, 12 and 13 cooperate in the body 21, formed when the units are stacked, to provide conductive plates 22 and 23 between the wafers 14 of dielectric material. It should here be noted that during the stacking of the units a small amount of conducting material, in the form of a paste or the like, may be inserted between the complementary conductive areas, as shown at 24, to assure complete electrical contact and, thus, electrically efficient plates. It will be seen that as a result of stacking the units so that conductive areas of matching pattern are aligned and in contact, the resulting conductive plates have a pattern corresponding to the pattern of the conductive areas from which they were formed. Consequently, conductive plate 22 corresponds in pattern to conductive areas 16 and conductive plate 23 similarly corresponds to conductive areas 15.

In forming a capacitor, as is well known in the art, it is normally necessary to electrically connect alternate plates of the capacitor. According to the present invention, this is achieved by applying lead means in the form of conductive material across the corners of the body 21, as shown at 25 and 26 for engaging respectively the plates 23 and 22. The electrically conductive material 25, which is electrically connected to plate 23 and to the outer conductive area 15 of end unit 11, is applied to the body 21 at the corner thereof at which the areas 15 and their corresponding plates electrically communicate with the edges of the units. In the illustrated form of the invention only one plate 23 is shown. However, it will be understood that if additional units were utilized in building the stack the electrically conductive material 25 would also be in contact with the additional plates having a pattern similar to plate 23. The electrically conductive material 26 may, as is clear from the drawings, be applied to any of the remaining corners of body 21 or to the sides thereof but, in the preferred form of the invention it is applied at the corner diagonally across from the corner at which electrically conductive material 25 is applied.

The patterns of the conductive areas are such that the plates of one pattern are electrically spaced or insulated from the electrically conductive material applied at the corners of the body for electrically connecting the plates of the other pattern, thus preventing short circuits in the operation of the capacitor. The plate 22 is spaced from the electrically conductive lead means 25 as a result of the corners 20 being removed in the pattern of conducting areas 16 and similarly plate 23 is spaced from electrically conductive lead means 26 by the removal of the corners 19 from the conductive areas 15.

The important advantage achieved by the capacitor structure aforedescribed is not only the unique and electrically efficient manner in which the alternate plates of the capacitor are electrically connected together to form two electrically separate groups, the groups then being connected to the outer conductive areas of the end plates of corresponding pattern, but is the physical tying together of the units into a body by the electrically conductive lead means 25 and 26. The lead means, in addition to electrically connecting their respective conductive plates and outer conductive areas, also engage each of the wafers in the body so that the units are physically tied together.

After the body 21, afore-described, has been built by stacking the units, lead wires 27 and 28 may be affixed thereto for connecting the capacitor into an electrical circuit or the like. While the lead wires may be connected to lead means 25 and 26 or to the electrically opposed sides of the capacitor in any other manner known to the art, in the preferred form of the invention they are connected one to each of the electrodes or outer conductive areas of the end units so that they project from the body 21 in a plane substantially parallel to the plane of the plates of the capacitor. In order to afford the most complete electrical contact with the capacitor and to assure ruggedness and strength and to reduce the silhouette of the completed component, the leads are flattened as shown at 27A and 28A. The flattened areas are soldered or similarly electrically connected to their respective outer conductive areas.

After the lead wires 27 and 28 are secured to the capacitor, it is impregnated and coated, as shown at 29, to fill the voids in the body and apply a protective coating thereto.

The capacitor structure heretofore described is the preferred form of the invention but it should be noted that the concepts of the invention are not limited solely to this structure and that variations can be made in the arrangement or relation of parts and in design.

According to the present invention, the capacitor 10 is made by first providing a plurality of units 11, 12 and 13. While these units may be formed by printing, silk screening or similarly applying the conductive silver areas 15 and 16 to the dielectric wafers 14, in the preferred form of the invention the wafers have their surfaces completely pre-silvered, a portion of which is then removed by etching, grinding, abrading or the like to form the desired patterns. In forming the stack the bottom unit, or as shown in the drawings unit 13, is positioned on a firing plate with the conductive area 15 facing upwardly.

A small amount of conducting material 24 is placed in the center of the conductive area 15 and then the unit 12 is placed on top of the unit 13 with the conductive area 15 thereof aligned with and in contact with the conductive area 15 of unit 13. This procedure is repeated as often as is necessary to obtain the desired number of units in the stack. In the illustrated embodiment of the invention a small amount of the conductive material 24 is placed on the upper conductive area 16 of unit 12 and then the unit 11 is positioned thereon with its conductive area 16 facing downwardly in alignment and in contact with the conductive area 16 of unit 12. At this point it should be noted that while the conductive material 24 may be of any type known to the art, in the preferred form of the invention we use a silver paste or the like containing approximately 70% silver and having a powdered glass frit in the composition which is adapted to fuse when the stack is fired, thus providing a more perfect electrical connection between the conductive areas. When the stack has been formed according to the preceding steps of the method it is placed in a furnace and fired at a temperature between 1200° and 1400° F. for approximately 10 minutes to solidify the silver paste 24 between the conductive areas. Thereafter, the stack is removed from the furnace and rapidly cooled at room temperature.

The next step in the manufacture of the capacitor is to apply the lead means or conductive material 25 and 26 at the corners of the body 21. This may be accomplished by dipping the corners of the body 21, having the plates recessed or extended, in a bath of silver paste or the like similar to the conducting material 24 used between the conductive areas in the stack or it may be accomplished by dispensing the conductive material thereon or applying it in any other manner known to the art. It is important that the conductive material not cover the corners of the body to an extent greater than is necessary to assure electrical contact between the lead means 25 or 26 and their respective plates and outer conductive areas. After the corners have been dipped the stack is again placed in a furnace and fired at a temperature and for a period of time sufficient to solidify the silver paste forming the lead means. Upon removing the stack from the furnace the lead wires 27 and 28 are soldered with a silver bearing solder to the outer conductive areas 16 and 15 respectively, of the end units 13 and 11. A preferred solder for securing the lead wires 27 and 28 to their respective electrodes or outer conductive areas is one containing approximately 96.5% lead, 1% tin and 2½% silver.

The final step in the manufacture of the capacitor 10 is the cleaning of the flux residues and other contaminants from the body 21 and then vacuum impregnating the same with an insulating material to remove air from between the wafers and provide a protective film over all of the units in the stack. According to the invention, the stack is immersed in a bath of silicone rubber or the like and thereafter, while still in the bath is placed in a vacuum chamber and a vacuum is drawn to produce an absolute pressure of approximately 1 inch of mercury. Upon removal of the capacitor from the vacuum chamber, the voids therein are filled by the silicone rubber or the like, as shown at 29, and the capacitor is complete and ready for such other operations as may be necessary for it to be put to its intended use.

Thus, among others, the several objects and advantages of the invention as aforenoted are achieved. Obviously numerous changes in the structure and method may be resorted to without departing from the spirit of the invention as defined by the claims.

We claim:

1. A capacitor comprising a plurality of stacked wafers of dielectric material, planar electrically conductive pattern means between said wafers for forming the conductive plates of the capacitor, the alternate conductive plates being of one pattern and the remaining conductive plates being of another pattern and unitary lead means extending over the edges of the outer wafers of the stack and between the edges of alternate adjacent wafers and electrically spaced from the conductive plates therebetween for tying said wafers together to form a body and electrically connecting alternate plates to form two groups, the pattern of the plates in each group corresponding to the pattern of all of the other plates in the group.

2. A capacitor comprising a plurality of units, each unit including a wafer of dielectric material having the opposite surfaces thereof provided with material forming a conductive area thereon, the conductive areas of each unit being planar and formed in different patterns so that the edges thereof are predeterminately spaced by said dielectric material and the area is electrically communicated with the edge of the unit, said units being stacked with said conductive areas of matching pattern in electrical contact to form conductive plates between said wafers, the conductive plates of one pattern being electrically communicated to the edge of the stack at one side thereof and the conductive plates of the other pattern being electrically communicated to the edge of the stack at another side thereof and a unitary lead means for each different area pattern extending over the edges of the outer wafers of the stack and between the edges of alternate adjacent wafers and electrically spaced from the conductive plates therebetween for tying all of the units together to form a body, said unitary lead means each having electrical contact with only the conductive plates of its respective area pattern for electrically connecting alternate plates in the stack to form two groups, each group being electrically connected to an outer conductive area of an end unit.

3. A capacitor comprising a plurality of units, each unit including a wafer of dielectric material having the opposite surfaces thereof provided with material forming a conductive area thereon, the conductive area on one of said surfaces of each of said wafers being planar and formed inwardly of the periphery of said wafer so that there is a border of said dielectric material therearound and being provided with conductive means communicating said area with the edge of said unit across said border, said other conductive area being planar and extending to the periphery of said wafer and having a portion thereof removed at the edge of said wafer adjacent said means for communicating said first area with said edge, said units being stacked with matching conductive areas in electrical contact to form conductive plates between said wafers and unitary lead means extending over the edges of the outer wafers of the stack and between the edges of alternate adjacent wafers and electrically spaced from the conductive plates therebetween for tying all of the units together to form a body, said lead means including separate means disposed adjacent different side edges of the stack for electrically connecting alternate plates to form two groups, each group being electrically connected to an outer conductive area of an end unit.

4. A capacitor comprising a plurality of units, each unit including a wafer of dielectric material having the opposite surfaces thereof provided with material forming a conductive area thereon, the conductive areas of each unit being planar and formed in different patterns so that the edges thereof are predeterminately spaced by said dielectric material and the areas of said opposite surfaces electrically communicate with the edge of the unit adjacent a different portion of the periphery of the wafer, said units being stacked with conductive areas of matching pattern in electrical contact to form conductive plates between said wafers, the alternate conductive plates being of the same pattern, and unitary lead means extending over the edges of the outer wafers of the stack and between the edges of alternate adjacent wafers and electrically spaced from the conductive plates therebetween for tying all of the units together to form a body, said lead means including means for electrically connecting all of the plates of one pattern to an outer conductive area of an end unit and separate means spaced therefrom for electrically connecting all of the plates of said other pattern to the outer conductive area of said other end unit.

5. A capacitor comprising a plurality of rectangular units, each unit including a rectangular wafer of dielectric material having the opposite surfaces thereof provided with material forming a conductive area thereon, the conductive areas of each of said units being planar and formed in predetermined different patterns so that the edges thereof are spaced by said dielectric material, said patterns being provided with means for electrically communicating them with the edge of said unit at different corners of said wafer, said units being stacked with conductive areas of matching pattern in electrical contact to form conductive plates between said wafers, the alternate conductive plates being of the same pattern, and unitary lead means extending over the edges of the outer wafers of the stack and between the edges of alternate adjacent wafers and electrically spaced from the conductive plates therebetween for tying all of the units together to form a body, said lead means including means at one corner of said body for electrically connecting all of the plates of one pattern and electrically connecting them to an outer conductive area of an end unit and separate means at a different corner of said body for electrically connecting all of the plates of said other pattern and electrically connecting them to the outer conductive area of said other end unit.

6. A capacitor comprising a plurality of rectangular units, each unit including a rectangular wafer of dielectric material having the opposite surfaces thereof provided with material forming a planar conductive area thereon, one of the conductive areas of each of said units lying inwardly of the periphery of the wafer so that there is a border of said dielectric material therearound and being formed with a portion extending across said border at a corner of said wafer for electrically communicating the area with an edge of the unit, said other conductive area being formed with a portion thereof removed adjacent the corner at which said first area communicates with the edge of said unit, said units being stacked with matching conductive areas in electrical contact to form conductive plates between said wafers, the alternate conductive plates being of the same pattern and corresponding to the areas from which they were formed, unitary lead means extending over the edges of the outer wafers of the stack and between the edges of alternate adjacent wafers and electrically spaced from the conductive plates therebetween for tying all of the units together to form a body, said lead means including means at said one corner for electrically connecting all of said plates having a pattern corresponding to said first conductive area and electrically connecting such plates to the matching conductive area of an end unit, and separate means for electrically connecting all of the plates having a pattern corresponding to said other conductive area and electrically connecting such plates to the matching conductive area of the other end unit, and lead wires connected to the outer conductive areas of the end units.

7. A capacitor comprising a plurality of rectangular units, each unit including a rectangular wafer of dielectric material having the opposite surfaces thereof provided with material forming a conductive area thereon, one of the conductive areas of each unit being planar and formed in a pattern smaller than the surface of said wafer so that a border of said dielectric material is formed thereabout and having a portion cutting across said border at a corner of said wafer for electrically communicating said area with the edge of said unit, the other conductive area of each unit being planar and formed in a pattern substantially the same size as the surface of said wafer and having a corner removed corresponding to the corner across which a portion of said first area extends; said units being stacked with said conductive areas of matching pattern aligned and in contact; means for electrically connecting said contacting conductive areas of matching pattern to form conductive plates between said wafers, the alternate plates being of the same pattern and corresponding to the areas from which they were formed; lead means tying all of the units together to form a body, said lead means including a first unitary portion of conductive material at one corner of said body extending over the edges of the outer wafers of the stack and between the edges of the wafers sandwiching conductive plates corresponding to said second conductive area and electrically spaced from such plates for electrically connecting all of the plates having a pattern corresponding to the pattern of said first conductive area by electrically contacting the portions thereof cutting across said borders, said first portion electrically connecting said plates to an outer conductive area on an end unit having the same pattern, and a second unitary portion of conductive material at a different corner of said body extending over the edges of the outer wafers of the stack and between the wafers sandwiching conductive plates corresponding to said first conductive area and electrically spaced from such plates for electrically connecting all of the plates having a pattern corresponding to the pattern of said second conductive area to an outer conductive area on the other end unit having the same pattern; a lead wire connected to each of the outer conductive areas of the end units; and means coating the body and filling the voids therein around the conductive areas of said different patterns.

8. A capacitor as in claim 7, in which said second portion of conductive material is at the corner of said body diagonally across from said first portion of conductive material.

9. A capacitor as in claim 7, in which there are an odd number of units so that the outer conductive areas of the end units are of different pattern.

References Cited in the file of this patent

UNITED STATES PATENTS

| | | |
|---|---|---|
| 873,751 | Hopkins | Dec. 17, 1907 |
| 1,479,315 | Pickard | Jan. 1, 1924 |
| 2,437,212 | Schottland | Mar. 2, 1948 |
| 2,903,634 | Rayburn | Sept. 8, 1959 |

FOREIGN PATENTS

| | | |
|---|---|---|
| 879,280 | France | Feb. 18, 1943 |
| 1,020,016 | France | Jan. 30, 1953 |